United States Patent
Troy et al.

(10) Patent No.: US 9,881,192 B2
(45) Date of Patent: Jan. 30, 2018

(54) SYSTEMS AND METHODS FOR ELECTRONICALLY PAIRING DEVICES

(71) Applicant: THE BOEING COMPANY, Huntington Beach, CA (US)

(72) Inventors: James J. Troy, Issaquah, WA (US); Christopher Esposito, Bellevue, WA (US); Vladimir Karakusevic, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 97 days.

(21) Appl. No.: 14/699,713

(22) Filed: Apr. 29, 2015

(65) Prior Publication Data

US 2016/0318625 A1 Nov. 3, 2016

(51) Int. Cl.
| | | |
|---|---|---|
| G05B 23/00 | (2006.01) | |
| G06K 7/14 | (2006.01) | |
| G06Q 10/00 | (2012.01) | |
| H04W 4/00 | (2009.01) | |

(52) U.S. Cl.
CPC ........... *G06K 7/1413* (2013.01); *G06Q 10/00* (2013.01); *H04W 4/00* (2013.01)

(58) Field of Classification Search
CPC ...... G07C 9/00309; G07C 2009/00793; G07C 2209/63; G07C 9/00111; B60R 25/24
USPC .... 340/5.6, 5.65, 5.61, 5.8, 5.86, 10.1, 10.5, 340/12.22, 12.23, 12.28, 12.29, 12.52, 340/12.54, 12.51, 539.11
See application file for complete search history.

(56) References Cited

U.S. PATENT DOCUMENTS

| | | | |
|---|---|---|---|
| 2003/0197611 A1* | 10/2003 | Clifford | G07G 1/0045 340/572.1 |
| 2007/0279226 A1* | 12/2007 | Whitesmith | G08B 13/1427 340/572.1 |
| 2010/0127828 A1* | 5/2010 | Connolly | G06K 7/0008 340/10.1 |
| 2010/0283917 A1* | 11/2010 | Ueno | G08C 17/00 348/734 |
| 2012/0191297 A1 | 7/2012 | Callahan et al. | |
| 2014/0210598 A1* | 7/2014 | Mitchell | G06K 7/0008 340/10.5 |
| 2015/0222632 A1* | 8/2015 | Ichijo | H04L 63/0876 726/7 |

* cited by examiner

Primary Examiner — George Bugg
Assistant Examiner — Anthony D Afrifa-Kyei
(74) Attorney, Agent, or Firm — Armstrong Teasdale LLP

(57) ABSTRACT

A method for electronically pairing a plurality of control units with a plurality of objects in an aircraft is provided. The method includes identifying a selected control unit from the plurality of control units that will control a selected object from the plurality of objects, placing a hand-held scanner in close proximity to a first machine-readable tag on the selected control unit to acquire a first unique ID for only the selected control unit, placing the hand-held scanner in close proximity to a second machine-readable tag on the selected object to acquire a second unique ID for only the selected object, and associating the first unique ID with the second unique ID to pair the selected control unit with the selected object.

18 Claims, 6 Drawing Sheets

US 9,881,192 B2

SYSTEMS AND METHODS FOR ELECTRONICALLY PAIRING DEVICES

BACKGROUND

The field of the disclosure relates generally to electronically pairing devices or objects, and, more particularly, relates to a scanning system for quickly and efficiently pairing multiple devices.

Aircraft cabins may include a number of output devices (e.g., lights, vents, etc.) that are remotely controllable by a control panel, or controller, located, for example, on or near a user's seat. In at least some known systems, custom wire harnesses directly connect a controller to an output device. However, the custom wire harnesses are typically heavy and inflexible. Accordingly, in at least some other known systems, controller and output devices are in wired or wireless communication with one another, and each output device has a unique network address. The output device responds only to commands directed to the unique network address. This reduces the amount of wiring and allows output devices to be moved relative to controller, but requires the controller to be associated with the unique network address of the device being controlled.

Current systems and methods for pairing controllers and output devices are somewhat inefficient and error prone. For example, at least one method for pairing devices over a network requires the devices to first be connected to the network, and requires detailed location information as well as a learning mode for entering unique IDs for each output device to be controlled. The location information and unique IDs are manually entered for storage in a table. This method has multiple possible points of failure, include the initial acquisition of location information and unique IDs, and manual entry of data into the table (which is time consuming, tedious, and often involves transcription errors).

BRIEF DESCRIPTION

In one aspect, a method for electronically pairing a plurality of control units with a plurality of objects in an aircraft is provided. The method includes identifying a selected control unit from the plurality of control units that will control a selected object from the plurality of objects, placing a hand-held scanner in close proximity to a first machine-readable tag on the selected control unit to acquire a first unique ID for only the selected control unit, placing the hand-held scanner in close proximity to a second machine-readable tag on the selected object to acquire a second unique ID for only the selected object, and associating the first unique ID with the second unique ID to pair the selected control unit with the selected object.

In another aspect, a system for pairing a plurality of control units with a plurality of objects in an aircraft is provided. The system includes a hand-held scanner device configured to be placed in close proximity to a first machine-readable tag on a selected control unit of the plurality of control units to acquire a first unique ID for only the selected control unit, and be placed in close proximity to a second machine-readable tag on a selected object of the plurality of objects to acquire a second unique ID for only the selected object. The system further includes a computing device communicatively coupled to the handle-held scanner and configured to associate the first unique ID with the second unique ID to pair the selected control unit with the selected object such that the selected control unit controls the selected object.

In yet another aspect, a hand-held scanner for use in pairing a plurality of control units with a plurality of objects in an aircraft is provided. The hand-held scanner is configured to be placed in close proximity to a first machine-readable tag on a selected control unit of the plurality of control units to acquire a first unique ID for only the selected control unit, be placed in close proximity to a second machine-readable tag on a selected object of the plurality of objects to acquire a second unique ID for only the selected object, and pair the first unique ID with the second unique ID to associate the selected control unit with the selected object such that the selected control unit controls the selected object.

DETAILED DESCRIPTION

The systems and methods described herein facilitate creating an electronic pairing between devices or objects without requiring exact location information of the devices, manual transcription of data, or data extraction from a keyed table. Instead, the implementations described herein utilize machine readable identification information and a spatial sequencing process to develop pairings between devices. In addition to being used for device control, the data gathered during the pairing process may also be used for three-dimensional localization and visualization applications, as described herein.

Figure 1:
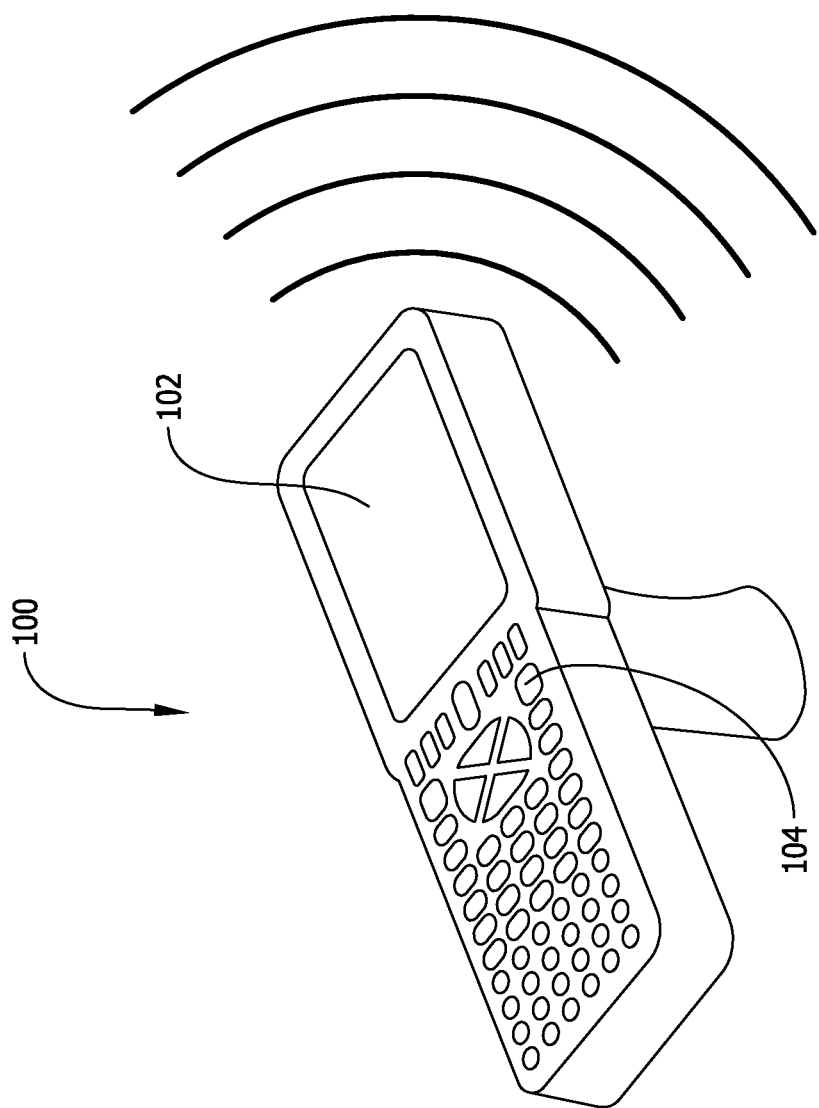
FIG. 1 is a schematic view of an example hand-held scanner.

FIG. 1 is a schematic view of an example hand-held scanner 100. Scanner 100 may be a radio-frequency identification (RFID) scanner, a barcode scanner, a quick response (QR) code scanner, and/or any other type of scanning device that enables scanner 100 to function as described herein. Scanner 100 includes a display 102 for displaying information to a user, and at least one input interface 104 (e.g., a button, a touch-screen interface, etc.) for receiving input from the user.

Scanner 100 is used to implement a pairing process that takes advantage of relative spatial associations and device information contained in (or derived from) machine readable tags on devices in order to differentiate devices. That is, in the example implementation, devices to be paired each include a tag that is readable by scanner 100. A user operates scanner 100 to correctly pair devices, as described herein.

Figure 2:
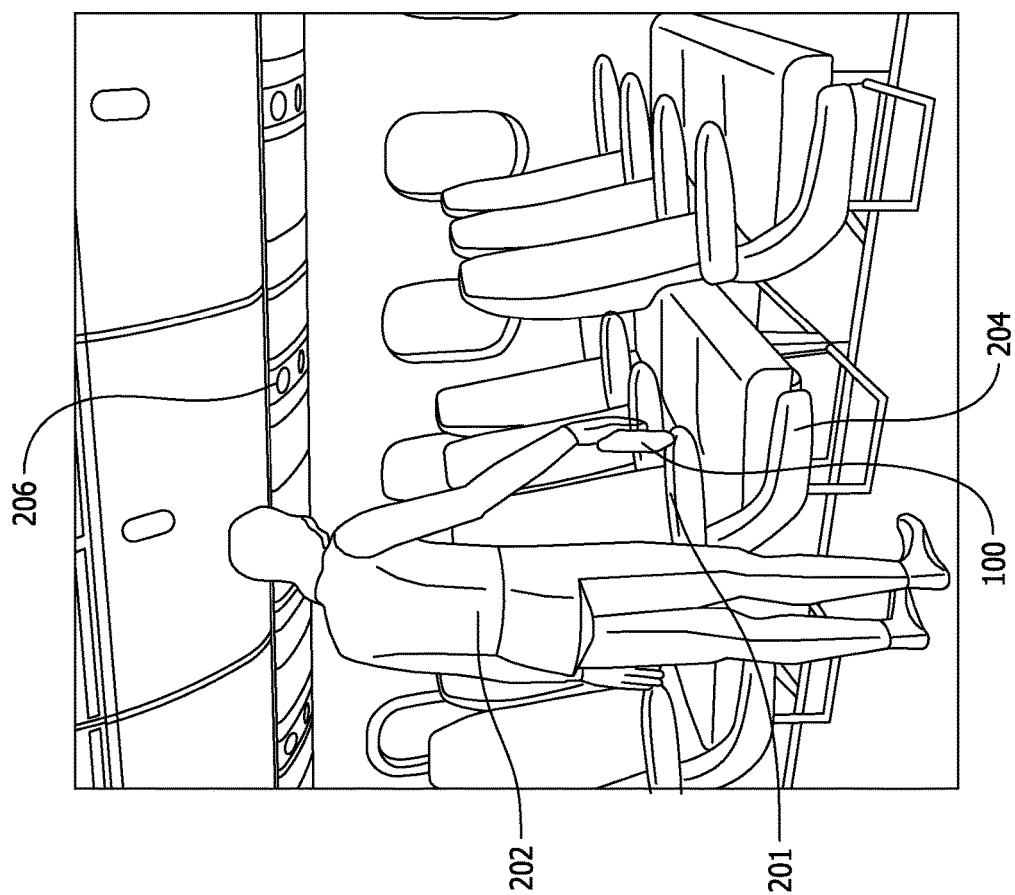
FIGS. 2 and 3 are schematic diagrams of a user performing an example pairing method.
Figure 3:
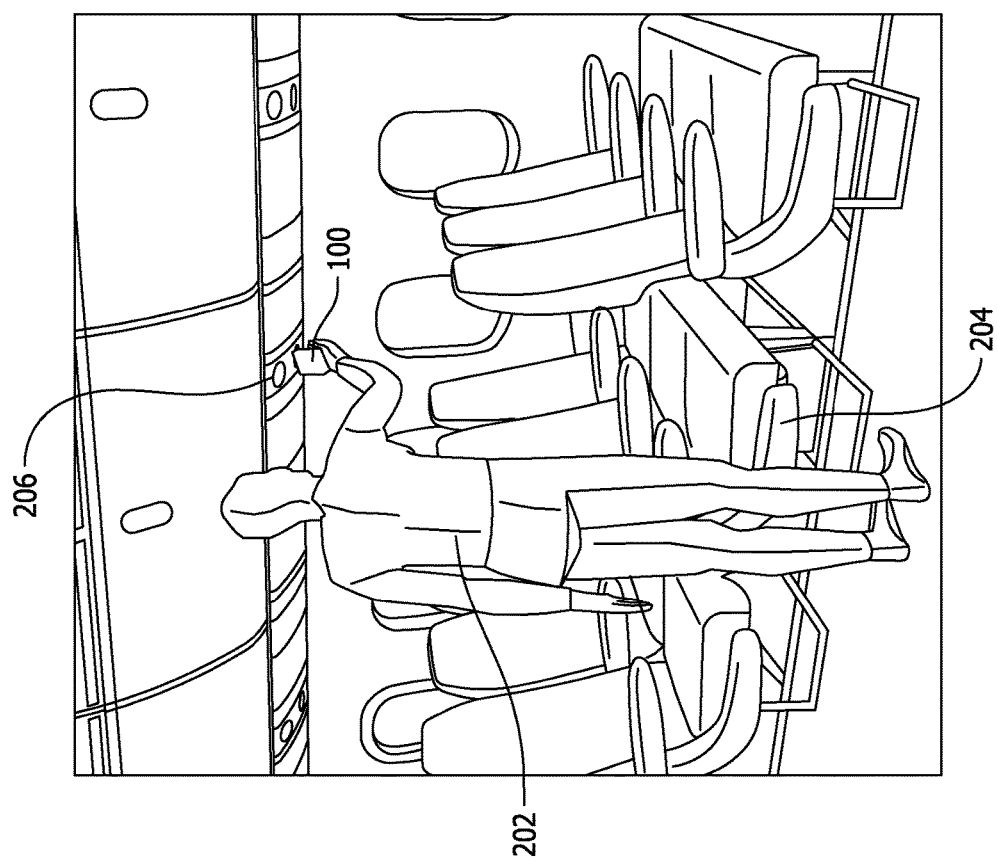

FIGS. 2 and 3 are schematic diagrams of a user 202 performing a pairing method. In the implementation shown in FIGS. 2 and 3, user 202 pairs a control unit 201 on a seat 204 with an associated device 206 on an aircraft. Associated devices 206 may include, for example, an overhead light, an entertainment system (e.g., a television), a vent, an electronic window shade, and an attendant notification system (e.g., a stewardess call button).

As shown in FIG. 2, to perform the pairing method, user 202 positions scanner 100 such that scanner detects control unit 201 on an associated seat 204. For an RFID scanner, this involves positioning scanner 100 such that the strongest RF signal detected by scanner 100 is a signal from control unit 201 of seat 204. For an optical (e.g., barcode or QR code) scanner 100, this involves directing a beam or view direction of scanner 100 such that scanner 100 reads an optical label on control unit 201 of seat 204. Once control unit 201 is scanned to acquire a unique ID, scanner 100 may give an indication (e.g., a visual, audio, or tactile alert) to user 202 to confirm control 201 has been scanned. In this implementation, control unit 201 is located on seat 204. Alternatively, control unit 201 may be located somewhere else than on seat 204.

Once scanner reads control unit 201, as shown in FIG. 3, user 202 positions scanner 100 such that scanner detects associated device 206 to be paired with control unit 201 on seat 204. As with control unit 201, for an RFID scanner, this involves positioning scanner 100 such that the strongest RF signal detected by scanner 100 is a signal from associated device 206. For an optical (e.g., barcode or QR code) scanner 100, this involves directing a beam or view direction of scanner 100 such that scanner 100 reads an optical label associated with associated device 206. Further, once associated device 206 is scanned to acquire a unique ID of associated device 206, scanner 100 may give an indication (e.g., a visual, audio, or tactile alert) to user 202 to confirm associated device 206 has been scanned. The pairing of control unit 201 and associated device 206 is then recorded (e.g., in a memory device on scanner 100, or in a memory device of a remote computing device in communication with scanner 100). In the example implementation, each associated device 206 may be paired with only one control unit 201. Accordingly, if user 202 attempts to pair more than one associated device 206 with a particular control unit 201, scanner 100 notifies user 202 with an error message. However, a single control unit 201 may be paired with multiple associated devices 206. After the pairing of control unit 201 with associated device 206 is recorded, a data set may be generated that includes a set of paired unique IDs for each of the control units 201 and associated devices 206, wherein the data file is generated prior to connection of each of the plurality of control units 201 and associated devices 206 to a communications network of the aircraft.

Figure 4:
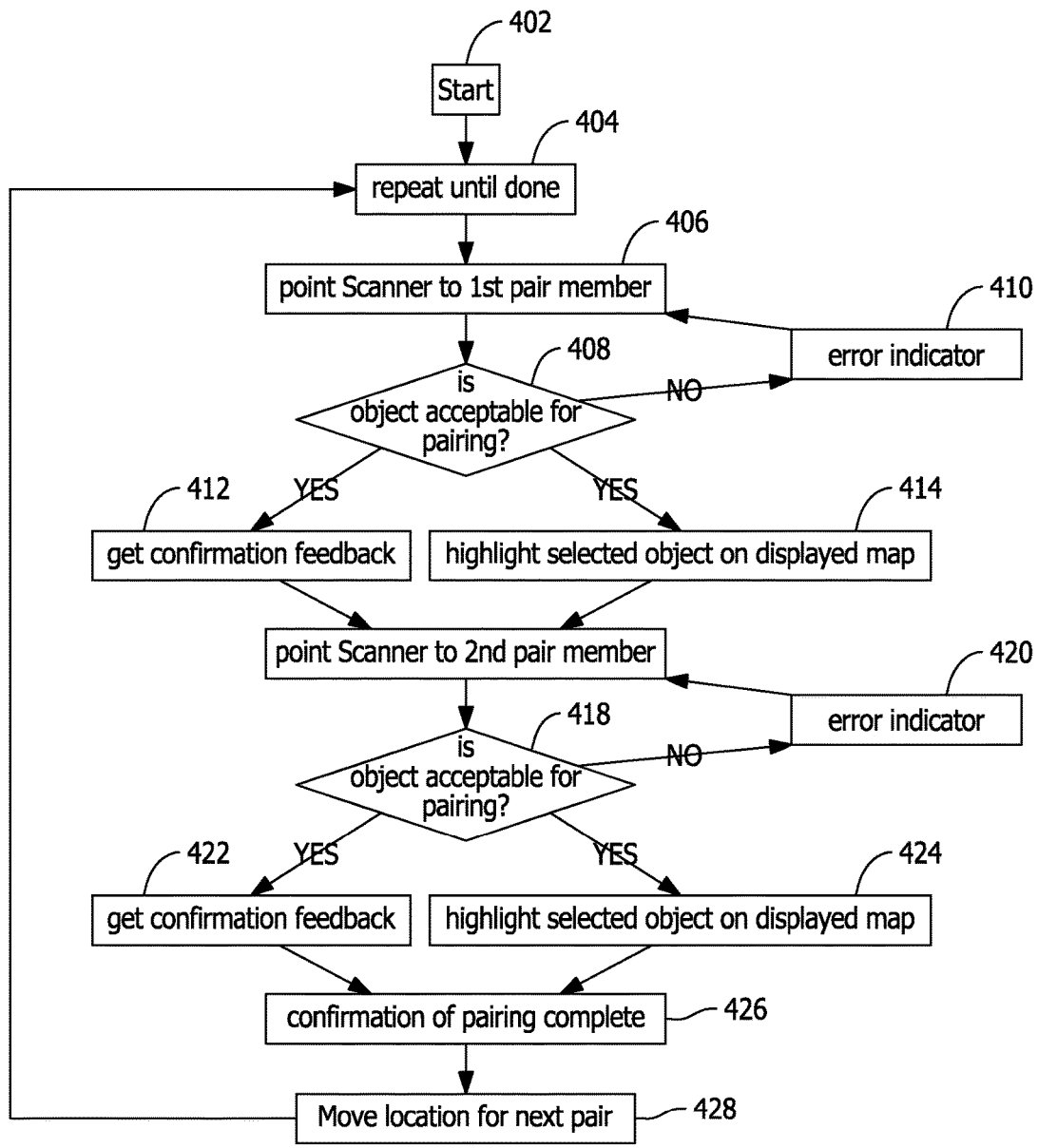
FIG. 4 is a flowchart of an example pairing method.

FIG. 4 is a flowchart 400 for an example pairing method performing by user 202. In this implementation, scanner 100 is used to scan one object, or pairing member, at a time. Flowchart begins at block 402, and at block 404, the method proceeds unless all necessary pairings have already been recorded. At block 406, user 202 aims scanner 100 at a first pair member (e.g., control unit 201). In the example implementation, user 202 also provides a starting location for scanner 100. For example, user 202 may input (e.g., using input interface 104) a current location into scanner 100. In another example, user 202 performs a secondary scan of a location tag (e.g., a scannable label located at a predetermined position on the aircraft) to orient scanner 100.

At block 408, scanner determines 100 if the first pair member is acceptable for pairing. If not, flow proceeds to block 410, and an error indicator (e.g., a visual, audio, or tactile alert) is generated and presented to user 202, prompting user 202 to again point scanner 100 at a first pair member at block 406.

If the first pair member is acceptable for pairing, scanner 100 acquires the unique ID for the first pair member, and flow proceeds to blocks 412 and 414. At block 412, scanner 100 gives confirmation feedback (e.g., a visual, audio, or tactile alert) to user 202. At block 414, scanner 100 may highlight the scanned first pair member on a map (displayed, for example, on display 102 of scanner 100). Flow then proceeds to block 416.

At block 416, user 202 aims scanner 100 at a second pair member (e.g., associated device 206). At block 418, scanner determines 100 if the second pair member is acceptable for pairing. If not, flow proceeds to block 420, and an error indicator (e.g., a visual, audio, and/or tactile alert) is generated and presented to user 202, prompting user 202 to again point scanner 100 at a second pair member at block 416. For example, if user 202 has scanned a first overhead light as the first pair member, and attempts to scan a second overhead light as the second pair member, scanner 100 will generate an error indicator.

If the second pair member is acceptable for pairing, scanner 100 acquires the unique ID for the second pair member, and flow proceeds to blocks 422 and 424. At block 422, scanner 100 gives confirmation feedback (e.g., a visual, audio, and/or tactile alert) to user 202. At block 424, scanner 100 highlights the scanned second pair member on the map (displayed, for example, on display 102 of scanner 100). Flow then proceeds to block 426.

At block 426, scanner 100 gives confirmation feedback (e.g., a visual, audio, and/or tactile alert) to user 202 that the pairing between the first pair member and the second pair member is complete, and the pairing data is recorded (e.g., in a memory device on scanner 100, or in a memory device of a remote computing device in communication with scanner 100). The format of the pairing data may be an ASCII text file, a binary file, and/or any other type of data file format. At block 428, user 202 moves to a location for the next pair to be scanned, and flow returns to block 404. A data file may be generated from the multiple sets of acquired paring data (where parings may include unique IDs for each first pair member and associated second pair member), where the data file is generated prior to connection of each of the plurality of pair members to a communications network of the aircraft. A data file is generated from multiple sets of acquired pairing data, and the multiple first pair members communicate with the multiple second pair members over the communication network (e.g., a wireless network) in accordance with the data file. For example, the data file may be uploaded to a network control system that controls communications between the first and second pair members.

The pairing data collected during the method shown in FIG. 4 may be integrated with a graphical representation of the environment within which the scanning is being performed. This enables user 202 to build a pairing map by scanning first and second objects (collecting the unique IDs of each), and associating the unique IDs of the first and second objects with each other. A successful pairing can then be shown on a graphics display (e.g., displayed on scanner 100), and user 202 can move on to complete additional pairings. For example, the unique IDs of the first and second objects may be displayed on a two-dimensional or three-dimensional graphical representation of an aircraft seat layout.

In some implementations, a portable computing device (e.g., a tablet or wearable computer device) is equipped with scanner 100, which may be detachable from the portable computing device (not shown). Information associated with successful pairings may be displayed on the portable computing device. Further, portable computing device may include software that allows user 202 to modify the way successful pairings are displayed (e.g., whether they are displayed in a textual or graphical form, the order in which the pairings are displayed, etc.).

Figure 5:
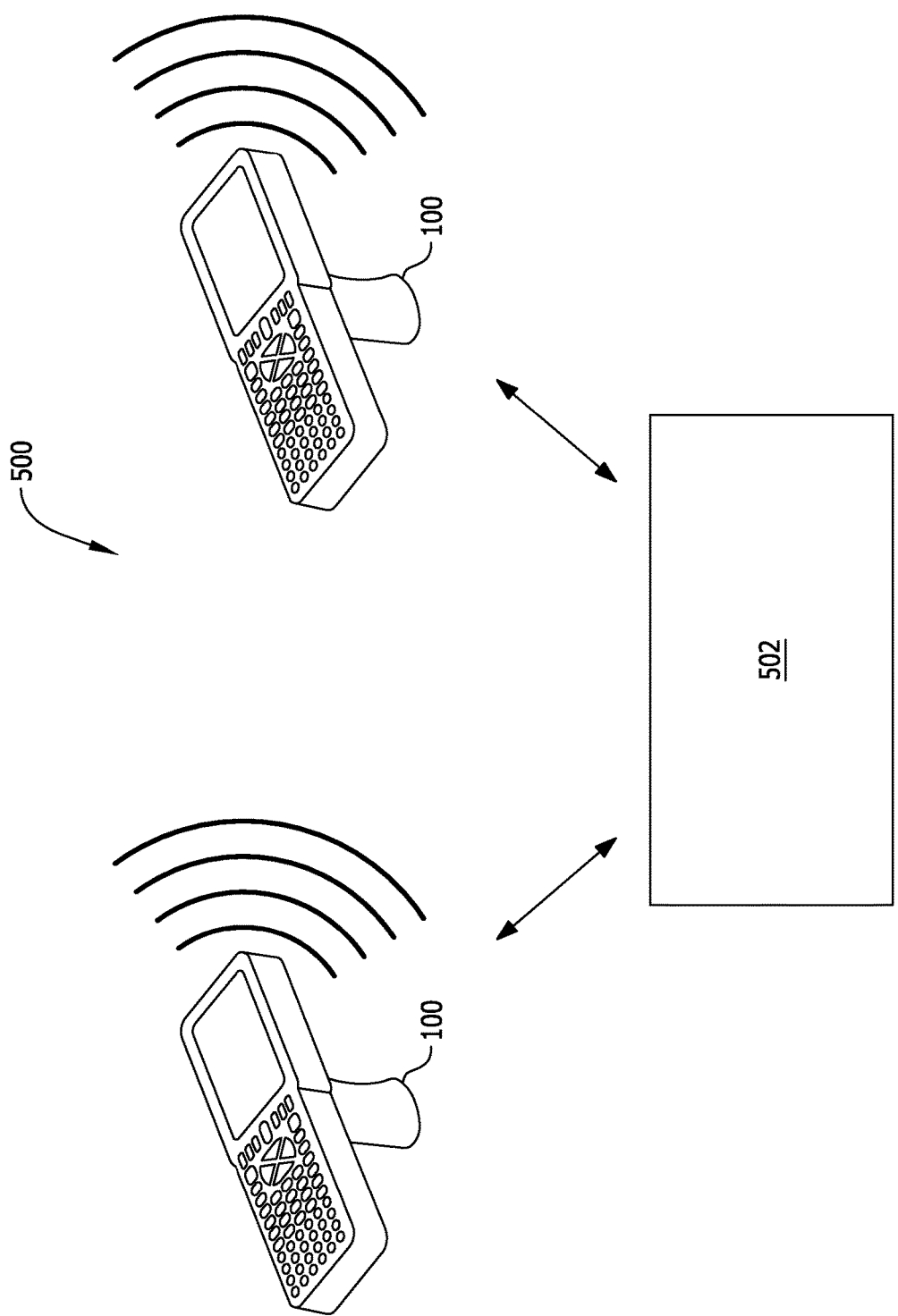
FIG. 5 is a schematic diagram of an example pairing system.

FIG. 5 is a schematic diagram of an example pairing system 500. As shown in FIG. 5, in some implementations, one or more scanners 100 communicate with a central computing device 502. Central computing device 502 receives and stores pairing data from each of the one or more scanners 100. In implementations including multiple scanners 100, central computing device 502 consolidates the pairing data from multiple scanners 100 to form a comprehensive set of pairing data for all scanners 100. Accordingly, when a first user generates first pairings for a first section of an aircraft and a second user generates second pairings for a second section of the aircraft, the pairing data from the first and second pairings can be combined at central computing device 502 to form a larger, more comprehensive set of pairing data for the aircraft. In other implementations where multiple scanners 100 are used, scanners 100 may communicate with each other to update or synchronize the list of pairing data, without the need for central computing device 502.

During acquisition of the unique ID from each object, it is possible that signals from more than one object are detected by scanner 100. Accordingly, scanner 100 may either use information encoded in the unique IDs detected, or use an automatic lookup table (e.g., stored in a memory device) that includes device types associated with the unique IDs detected, to determine which object is of the type desired for the pairing currently being performed. In some implementations, scanner 100 may display each detected object, and prompt a user to select the correct object for pairing.

The pairing data may be displayed to user 202 in multiple different formats, and may be displayed on scanner 100, central computing device 502, and/or any other suitable display device. In one implementation, a three-dimensional model (e.g., of an aircraft interior) is displayed, with the pairing data overlaid on the three-dimensional model. This may assist user 202 in confirming locations of the paired objects in terms of a coordinate system (e.g., a coordinate system tied to seat numbers in the aircraft interior). Upon confirming the locations of the paired objects, and prior to connection of each of the paired objects to a communications network of the aircraft, a data file may be generated from the multiple sets of acquired paring data (where parings may in unique IDs for each first pair member and associated second pair member). The data file of paired unique IDs is then uploaded (e.g., during the manufacture of the aircraft) to a network control system configured to control communications between the plurality of seat units and objects, where the data file uploaded such that a communication from the selected seat unit will control the selected object. Accordingly, the data file of paired unique IDs may, for example, improve the process of manufacturing the aircraft by permitting at least first and second users to respectively generate first pairings for a first section of an aircraft and second pairings for a second section of the aircraft, such that the pairing data from the first and second pairings can be collected more quickly and combined into a data file prior to connection of each of the plurality of paired objects to a network.

In addition to using the pairing data to enable control of associated device 206 by control unit 201, the systems and methods described herein may also be used to associate data acquired for each object in a pair (e.g., the unique ID) with a particular seat number or other data point that indicates a location of the paired objects in a coordinate system. The seat number is localization information that provides location data for the scanned objects in terms of "seat coordinates". Specifically, in the example implementation, when pairing data is recorded, a seat number associated with the pairing data is also recorded. The pairing data and associated location information (e.g., seat number) may be made available for use by other applications, as described herein. Alternatively, in some implementations, the pairing data may be associated with Cartesian (e.g., x, y, z) coordinates.

The displayed information may also be based on localization information acquired during the pairing process. For example, in one implementation, scanner 100 and/or central computing device 502 uses the seat number or coordinates associated with the pairing data to locate scanner 100 and/or user 202 within the environment. Further, applications such as three-dimensional visualization software may use the localization information to provide real-time or near real-time viewpoint location data in an interactive three-dimensional environment. This generation and use of localization information may facilitate addressing issues, for example, in an aircraft manufacturing process.

In one implementation, after the pairing data and associated localization information is acquired and stored, user 202 can scan an object with scanner 100, and scanner 100 returns a location of user 202 based on the stored pairing data and localization information. Further, a viewpoint in a three-dimensional display environment (displayed, for example on scanner 100 and/or central computing device 502) may be moved to the location of user 202. This enables user 202 to quickly determine their location for applications related to inspection, quality control, and tours of the aircraft.

Other information to be associated with the pairing data may also be collected using scanner 100. For example, scanner 100 may generate a time stamp associated with the pairing data, the time stamp indicating a time at which each object was scanned. In another example, user 202 may enter information to be associated with the pairing data (e.g., using input interface 104), such as an aircraft designation or a user ID.

During the pairing process, user 202 may be unable to scan one or more objects. For example, a machine-readable tag on an object may be missing or damaged. Accordingly, scanner 100 allows user to log (e.g., using input interface 104) the location of a defective object that cannot be scanned. A corrective action report listing the failure to scan one or more objects may also be generated.

Figure 6:
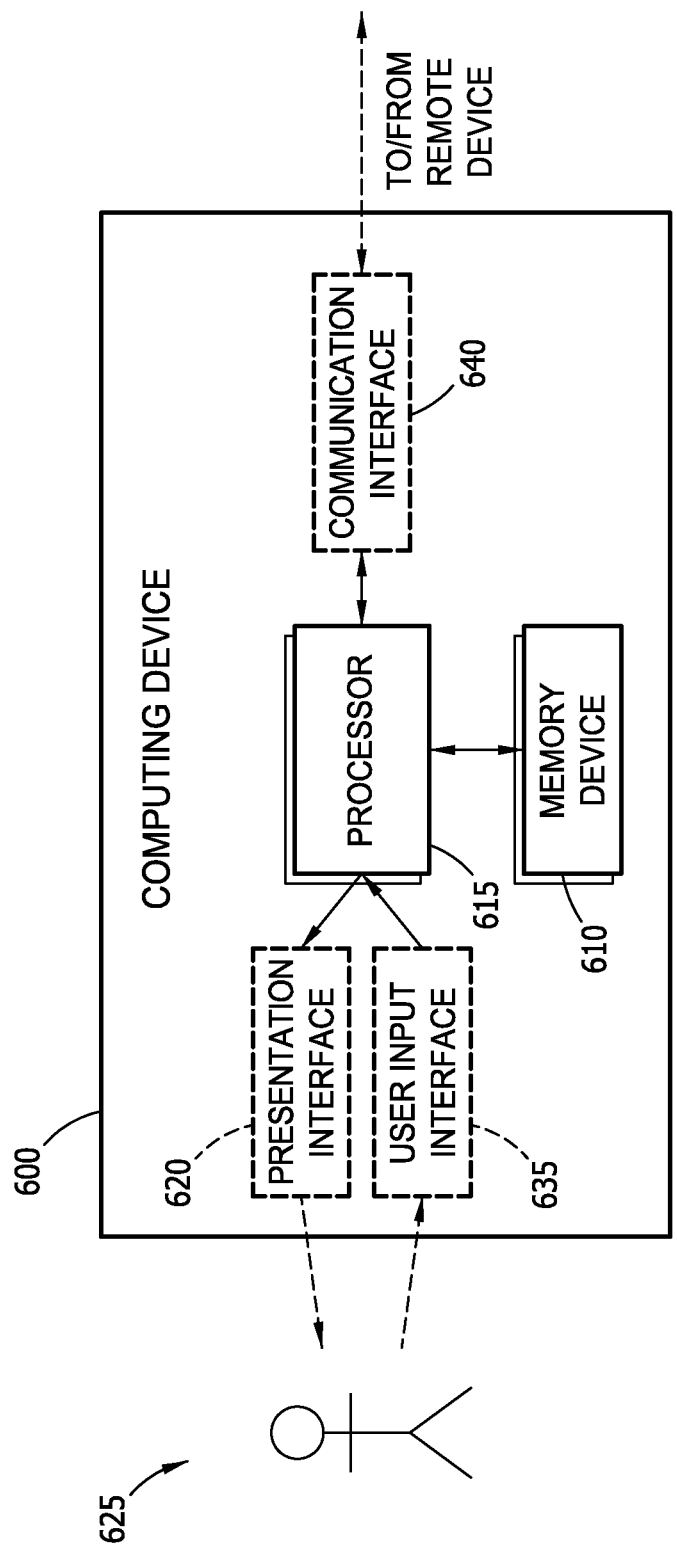
FIG. 6 is a block diagram of an example computing device that may be used with the pairing system shown in FIG. 5.

FIG. 6 is a block diagram of a computing device 600 that may be used with the implementations described herein. For example, scanner 100 and/or central computing device 502 may be implemented using computing device 600. Computing device 600 includes at least one memory device 610 and a processor 615 that is coupled to memory device 610 for executing instructions. In some implementations, executable instructions are stored in memory device 610. In the example implementation, computing device 600 performs one or more operations described herein by programming processor 615. For example, processor 615 may be programmed by encoding an operation as one or more executable instructions and by providing the executable instructions in memory device 610.

Processor 615 may include one or more processing units (e.g., in a multi-core configuration). Further, processor 615 may be implemented using one or more heterogeneous processor systems in which a main processor is present with secondary processors on a single chip. In another illustrative example, processor 615 may be a symmetric multi-processor system containing multiple processors of the same type. Further, processor 615 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the example implementation, memory device 610 is one or more devices that enable information such as executable instructions and/or other data to be stored and retrieved. Memory device 610 may include one or more computer readable media, such as, without limitation, dynamic random access memory (DRAM), static random access memory (SRAM), a solid state disk, and/or a hard disk. Memory device 610 may be configured to store, without limitation, application source code, application object code, source code portions of interest, object code portions of interest, configuration data, execution events and/or any other type of data.

In the example implementation, computing device 600 includes a presentation interface 620 that is coupled to processor 615. Presentation interface 620 presents information to a user 625, such as user 202 (shown in FIGS. 2 and 3). For example, presentation interface 620 may include a display adapter (not shown) that may be coupled to a display device, such as a cathode ray tube (CRT), a liquid crystal display (LCD), an organic LED (OLED) display, and/or an "electronic ink" display. In some implementations, presentation interface 620 includes one or more display devices.

In the example implementation, computing device 600 includes a user input interface 635. User input interface 635 is coupled to processor 615 and receives input from user 625. User input interface 635 may include, for example, a keyboard, a pointing device, a mouse, a stylus, a touch sensitive panel (e.g., a touch pad or a touch screen), a gyroscope, an accelerometer, a position detector, and/or an audio user input interface. For example, user input interface may be implemented as input interface 104 of scanner 100. A single component, such as a touch screen, may function as both a display device of presentation interface 620 and user input interface 635.

Computing device 600, in the example implementation, includes a communication interface 640 coupled to processor 615. Communication interface 640 communicates with one or more remote devices. To communicate with remote devices, communication interface 640 may include, for example, a wired network adapter, a wireless network adapter, and/or a mobile telecommunications adapter.

The implementations described herein facilitate creating an electronic pairing between devices or objects without requiring exact location information of the devices, manual transcription of data, or data extraction from a keyed table. Instead, the implementations described herein utilize machine readable identification information and a spatial sequencing process to develop pairings between devices. Data gathered during the pairing process may be used for three-dimensional localization and visualization applications, as described herein.

As compared to at least some known pairing systems, the implementations described herein incorporate user feedback or relative spatial data to eliminate a need to first connect each of the plurality of seat units and output devices to a communications network of an aircraft before pairing, as well as a need to record locations of scanned devices, a need to look-up an ID from a location table, and a need for manual data transcription. Accordingly, the systems and methods described herein eliminate many of the drawbacks of at least some known pairing systems, reducing the time necessary to collect pairing information. Further, the scanners described herein are very reliable and relatively inexpensive. Moreover, relatively little training will be required to operate the systems described herein. A user need only visually identify the two objects to be paired and move the scanner to acquire the unique ID of each object. No manual entry is required.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for electronically pairing a plurality of control units with a plurality of objects in an aircraft, the method comprising:
    identifying a selected control unit from the plurality of control units that will control a selected object from the plurality of objects;
    placing a hand-held scanner in close proximity to a first machine-readable tag on the selected control unit to acquire a first unique ID for only the selected control unit;
    placing the hand-held scanner in close proximity to a second machine-readable tag on the selected object to acquire a second unique ID for only the selected object;
    associating the first unique ID with the second unique ID to pair the selected control unit with the selected object;
    generating a data file including a set of paired unique IDs for each of the plurality of control units and associated objects; and
    uploading the data file to a communications network of the aircraft to communicatively couple each of the plurality of control units and associated objects, the communications network configured to control communications between each of the plurality of control units and associated objects.

2. A method in accordance with claim 1, further comprising uploading the data file such that a communication from the selected control unit will control the selected object.

3. A method in accordance with claim 1, further comprising generating, at the hand-held scanner, at least one of an audible, visual and tactile indication that at least one of the first unique ID has been acquired and the second unique ID has been acquired.

4. A method in accordance with claim 1, further comprising generating, at the hand-held scanner, at least one of an audible, visual and tactile indication that the hand-held scanner has failed to acquire at least one of the first unique ID and the second unique ID.

5. A method in accordance with claim 4, further comprising generating a corrective action report that includes information related to the failure to acquire at least one of the first unique ID and the second unique ID.

6. A method in accordance with claim 1, further comprising generating, at the hand-held scanner, at least one of an audible, visual and tactile indication that the first and second unique IDs have been paired.

7. A method in accordance with claim 1, further comprising displaying, on a display device, a relative location of at least one of the selected control unit and the selected object on a two-dimensional or three-dimensional image of an aircraft seat layout.

8. The method of claim 1, further comprising scanning, using the hand-held scanner, at least one of the first and second machine-readable tags to determine a current location of the hand-held scanner on the aircraft.

9. A system for pairing a plurality of control units with a plurality of objects in an aircraft, the system comprising:
   a hand-held scanner device configured to:
      be placed in close proximity to a first machine-readable tag on a selected control unit of the plurality of control units to acquire a first unique ID for only the selected control unit; and
      be placed in close proximity to a second machine-readable tag on a selected object of the plurality of objects to acquire a second unique ID for only the selected object; and
   a computing device communicatively coupled to the handle-held scanner and configured to:
      associate the first unique ID with the second unique ID to pair the selected control unit with the selected object such that the selected control unit controls the selected object;
      generate a data file including a set of paired unique IDs for each of the plurality of control units and associated objects; and
      upload the data file to a communications network of the aircraft to communicatively couple each of the plurality of control units and associated objects, the communications network configured to control communications between each of the plurality of control units and associated objects.

10. A system in accordance with claim 9, wherein the computing device is further configured to upload the data file such that a communication from the selected control unit will control the selected object.

11. A system in accordance with claim 9, wherein the hand-held scanner is further configured to generate at least one of an audible, visual and tactile indication that at least one of the first unique ID has been acquired and the second unique ID has been acquired.

12. A system in accordance with claim 9, wherein the hand-held scanner is further configured to generate at least one of an audible, visual and tactile indication that the hand-held scanner has failed to acquire at least one of the first unique ID and the second unique ID.

13. A system in accordance with claim 12, wherein the hand-held scanner is further configured to generate a corrective action report that includes information related to the failure to acquire at least one of the first unique ID and the second unique ID.

14. A system in accordance with claim 9, wherein the hand-held scanner is further configured to generate at least one of an audible, visual and tactile indication that the first and second unique IDs have been paired.

15. A hand-held scanner for use in pairing a plurality of control units with a plurality of objects in an aircraft, the hand-held scanner configured to:
   be placed in close proximity to a first machine-readable tag on a selected control unit of the plurality of control units to acquire a first unique ID for only the selected control unit;
   be placed in close proximity to a second machine-readable tag on a selected object of the plurality of objects to acquire a second unique ID for only the selected object;
   associate the first unique ID with the second unique ID to pair the selected control unit with the selected object such that the selected control unit controls the selected object;
   generate a data file including a set of paired unique IDs for each of the plurality of control units and associated objects; and
   upload the data file to a communications network of the aircraft to communicatively couple each of the plurality of control units and associated objects, the communications network configured to control communications between each of the plurality of control units and associated objects.

16. A hand-held scanner in accordance with claim 15, wherein the hand-held scanner is one of a radio-frequency identification (RFID) scanner and an optical scanner.

17. A hand-held scanner in accordance with claim 15, wherein the hand-held scanner is further configured to generate at least one of an audible, visual and tactile indication that at least one of the first unique ID has been acquired and the second unique ID has been acquired.

18. A hand-held scanner in accordance with claim 15, wherein the hand-held scanner is further configured to generate at least one of an audible, visual and tactile indication that the hand-held scanner has failed to acquire at least one of the first unique ID and the second unique ID.

* * * * *